US007944875B1

(12) United States Patent
Yegani et al.

(10) Patent No.: US 7,944,875 B1
(45) Date of Patent: May 17, 2011

(54) ENFORCEMENT OF USER LEVEL POLICIES FROM VISITED NETWORKS IN A MOBILE IP ENVIRONMENT

(75) Inventors: Parviz Yegani, Danville, CA (US); Biswaranjan Panda, Santa Clara, CA (US); Timothy P. Stammers, Raleigh, NC (US); Kent Leung, Los Altos, CA (US); Jayaraman Iyer, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 712 days.

(21) Appl. No.: 11/682,817

(22) Filed: Mar. 6, 2007

Related U.S. Application Data

(60) Provisional application No. 60/780,176, filed on Mar. 6, 2006.

(51) Int. Cl.
*H04W 4/00* (2009.01)
*H04J 3/24* (2006.01)

(52) U.S. Cl. ........ 370/328; 370/329; 370/338; 370/341; 370/349

(58) Field of Classification Search ................... 370/310, 370/328–329, 331, 338, 341, 395.43, 395.5, 370/395.52, 230, 349, 395.2, 395.21, 395.3; 455/406, 407–408, 410–411, 418–420, 432.1–432.3, 455/433–434, 439, 450, 509, 550.1, 552.1, 455/556.2, 560–561, 415, 422.1, 435.1–435.2, 455/436, 453, 456.3, 466, 512–514, 517; 726/1–7, 14; 709/218, 226, 228
See application file for complete search history.

(56) References Cited

U.S. PATENT DOCUMENTS

| | | | |
|---|---|---|---|
| 5,602,907 A | 2/1997 | Hata et al. | 379/114 |
| 5,822,411 A | 10/1998 | Swale et al. | 379/111 |
| 5,828,737 A | 10/1998 | Sawyer | 379/114 |
| 5,905,736 A | 5/1999 | Ronen et al. | 370/546 |
| 5,909,238 A | 6/1999 | Nagashima et al. | 348/3 |
| 5,946,670 A | 8/1999 | Motohashi et al. | 705/400 |
| 5,956,391 A | 9/1999 | Melen et al. | 379/114 |
| 5,970,477 A | 10/1999 | Roden | 705/32 |

(Continued)

FOREIGN PATENT DOCUMENTS

WO    WO 98/26381    12/1997

(Continued)

OTHER PUBLICATIONS

PCT Notification of Transmittal of the International Search Report and the Written Opinion of the International Searching Authority, or the Declaration with attached PCT International Search Report and Written Opinion of the International Searching Authority in International Application No. PCT/US2006/046800, dated Nov. 10, 2008, 10 pages.

(Continued)

*Primary Examiner* — Meless N Zewdu
(74) *Attorney, Agent, or Firm* — Baker Botts L.L.P.

(57) ABSTRACT

In one embodiment, a system for providing mobile Internet Protocol (IP) connectivity includes a memory and a processor. The memory stores one or more user level policies associated with an access terminal. The processor establishes a mobile IP connection with the access terminal. The processor receives the user level policies from a home IP gateway of the access terminal, and applies the user level policies to the mobile IP connection.

15 Claims, 2 Drawing Sheets

U.S. PATENT DOCUMENTS

| | | | |
|---|---|---|---|
| 5,987,498 A | 11/1999 | Athing et al. | 709/203 |
| 6,016,509 A | 1/2000 | Dedrick | 709/224 |
| 6,035,281 A | 3/2000 | Crosskey et al. | 705/14 |
| 6,047,051 A | 4/2000 | Ginzboorg et al. | 379/130 |
| 6,070,192 A | 5/2000 | Holt et al. | 709/227 |
| 6,075,854 A | 6/2000 | Copley et al. | 379/211 |
| 6,131,024 A | 10/2000 | Boltz | 455/405 |
| 6,137,791 A | 10/2000 | Frid et al. | 370/352 |
| 6,141,684 A | 10/2000 | McDonald et al. | 709/222 |
| 6,175,879 B1 | 1/2001 | Shah et al. | 709/330 |
| 6,208,977 B1 | 3/2001 | Hernandez et al. | 705/34 |
| 6,229,887 B1 | 5/2001 | Albers et al. | 379/219 |
| 6,282,573 B1 | 8/2001 | Darago et al. | 709/229 |
| 6,295,447 B1 | 9/2001 | Reichelt et al. | 455/417 |
| 6,330,562 B1 | 12/2001 | Boden et al. | 707/10 |
| 6,332,163 B1 | 12/2001 | Bowman-Amuah | 709/231 |
| 6,339,832 B1 | 1/2002 | Bowman-Amuah | 714/35 |
| 6,434,568 B1 | 8/2002 | Bowman-Amuah | 707/103 R |
| 6,434,628 B1 | 8/2002 | Bowman-Amuah | 714/48 |
| 6,438,594 B1 | 8/2002 | Bowman-Amuah | 709/225 |
| 6,442,748 B1 | 8/2002 | Bowman-Amuah | 717/108 |
| 6,466,964 B1 | 10/2002 | Leung et al. | 709/202 |
| 6,477,580 B1 | 11/2002 | Bowman-Amuah | 709/231 |
| 6,477,665 B1 | 11/2002 | Bowman-Amuah | 714/39 |
| 6,480,485 B1 | 11/2002 | Kari et al. | 370/352 |
| 6,490,451 B1 | 12/2002 | Denman et al. | 455/436 |
| 6,493,547 B1 | 12/2002 | Raith | 455/405 |
| 6,496,850 B1 | 12/2002 | Bowman-Amuah | 709/203 |
| 6,502,213 B1 | 12/2002 | Bowman-Amuah | 714/49 |
| 6,510,513 B1 | 1/2003 | Danieli | 713/156 |
| 6,529,909 B1 | 3/2003 | Bowman-Amuah | 707/10 |
| 6,529,948 B1 | 3/2003 | Bowman-Amuah | 709/217 |
| 6,539,396 B1 | 3/2003 | Bowman-Amuah | 707/103 R |
| 6,549,949 B1 | 4/2003 | Bowman-Amuah | 709/236 |
| 6,550,057 B1 | 4/2003 | Bowman-Amuah | 717/126 |
| 6,571,282 B1 | 5/2003 | Bowman-Amuah | 709/219 |
| 6,578,068 B1 | 6/2003 | Bowman-Amuah | 709/203 |
| 6,601,192 B1 | 7/2003 | Bowman-Amuah | 714/38 |
| 6,601,234 B1 | 7/2003 | Bowman-Amuah | 717/108 |
| 6,606,660 B1 | 8/2003 | Bowman-Amuah | 709/227 |
| 6,611,821 B2 | 8/2003 | Stahl et al. | 705/400 |
| 6,615,199 B1 | 9/2003 | Bowman-Amuah | 706/50 |
| 6,615,253 B1 | 9/2003 | Bowman-Amuah | 709/219 |
| 6,615,263 B2 | 9/2003 | Dulai et al. | 709/225 |
| 6,621,820 B1 | 9/2003 | Williams et al. | 370/395.31 |
| 6,636,242 B2 | 10/2003 | Bowman-Amuah | 715/764 |
| 6,640,238 B1 | 10/2003 | Bowman-Amuah | 709/201 |
| 6,640,244 B1 | 10/2003 | Bowman-Amuah | 709/207 |
| 6,647,262 B1 | 11/2003 | Demetrescu et al. | 455/436 |
| 6,665,537 B1 | 12/2003 | Lioy | 455/435 |
| 6,665,718 B1 | 12/2003 | Chuah et al. | 709/225 |
| 6,671,675 B2 | 12/2003 | Iwamura | 705/30 |
| 6,684,243 B1 | 1/2004 | Euget et al. | 709/222 |
| 6,684,256 B1 | 1/2004 | Warrier et al. | 709/238 |
| 6,708,225 B1 | 3/2004 | Cho et al. | 709/317 |
| 6,714,515 B1 | 3/2004 | Marchand | 370/231 |
| 6,715,145 B1 | 3/2004 | Bowman-Amuah | 718/101 |
| 6,728,266 B1 | 4/2004 | Sabry et al. | 370/468 |
| 6,728,365 B1 | 4/2004 | Li et al. | 379/329 |
| 6,728,884 B1 | 4/2004 | Lim | 713/201 |
| 6,742,015 B1 | 5/2004 | Bowman-Amuah | 718/101 |
| 6,742,036 B1 | 5/2004 | Das et al. | 709/226 |
| 6,757,371 B2 | 6/2004 | Kim et al. | 379/114.22 |
| 6,760,444 B1 | 7/2004 | Leung | 380/270 |
| 6,768,726 B2 | 7/2004 | Dorenbosch et al. | 370/331 |
| 6,769,000 B1 | 7/2004 | Akhtar et al. | 707/103 R |
| 6,771,623 B2 | 8/2004 | Ton | 370/331 |
| 6,785,256 B2 | 8/2004 | O'Neill | 370/338 |
| 6,804,518 B2 | 10/2004 | Core et al. | 455/436 |
| 6,826,173 B1 | 11/2004 | Kung et al. | 370/352 |
| 6,829,709 B1 | 12/2004 | Acharya et al. | 713/160 |
| 6,834,341 B1 | 12/2004 | Bahl et al. | 713/156 |
| 6,839,338 B1 | 1/2005 | Amara et al. | 370/338 |
| 6,842,906 B1 | 1/2005 | Bowman-Amuah | 719/330 |
| 6,856,676 B1 | 2/2005 | Pirot et al. | 379/201.01 |
| 6,889,321 B1 | 5/2005 | Kung et al. | 713/153 |
| 6,907,501 B2 | 6/2005 | Tariq et al. | 711/118 |
| 6,910,074 B1 | 6/2005 | Amin et al. | 709/227 |
| 6,915,345 B1 | 7/2005 | Tummala et al. | 709/225 |
| 6,917,605 B2 | 7/2005 | Kakemizu et al. | 370/338 |
| 6,920,503 B1 | 7/2005 | Nanji et al. | 709/230 |
| 6,922,404 B1 | 7/2005 | Narayanan et al. | 370/338 |
| 6,925,160 B1 | 8/2005 | Stevens et al. | 379/121.05 |
| 6,947,401 B2 | 9/2005 | El-Malki et al. | 370/331 |
| 6,961,774 B1 | 11/2005 | Shannon et al. | 709/227 |
| 6,967,941 B2 | 11/2005 | Roy | 370/338 |
| 6,978,128 B1 | 12/2005 | Raman et al. | 455/414 |
| 6,980,802 B2 | 12/2005 | Jung | 455/436 |
| 6,980,962 B1 | 12/2005 | Arganbright et al. | 705/26 |
| 6,981,047 B2 | 12/2005 | Hanson et al. | 709/227 |
| 6,982,967 B1 | 1/2006 | Leung | 370/328 |
| 6,990,337 B2 | 1/2006 | O'Neill et al. | 455/422.1 |
| 6,993,333 B2 | 1/2006 | Laroia et al. | 455/436 |
| 7,003,294 B2 | 2/2006 | Singhai et al. | 455/435.1 |
| 7,020,697 B1 | 3/2006 | Goodman et al. | 709/223 |
| 7,024,687 B2 | 4/2006 | Chaudhuri et al. | 726/3 |
| 7,028,311 B2 | 4/2006 | Roach et al. | 719/328 |
| 7,039,027 B2 | 5/2006 | Bridgelall | 370/329 |
| 7,054,268 B1 | 5/2006 | Parantainen et al. | 370/231 |
| 7,079,499 B1 | 7/2006 | Akhtar et al. | 370/310 |
| 7,082,301 B2 | 7/2006 | Jagadeesan et al. | 455/436 |
| 7,103,359 B1 | 9/2006 | Heinonen et al. | 455/436 |
| 7,127,234 B2 | 10/2006 | Ishii | 455/411 |
| 7,130,286 B2 | 10/2006 | Koodli et al. | 370/331 |
| 7,133,386 B2 | 11/2006 | Holur et al. | 370/331 |
| 7,142,520 B1 * | 11/2006 | Haverinen et al. | 370/311 |
| 7,151,758 B2 | 12/2006 | Kumaki et al. | 370/331 |
| 7,151,772 B1 | 12/2006 | Kalmanek et al. | 370/390 |
| 7,154,868 B1 | 12/2006 | Sharma et al. | 370/331 |
| 7,161,914 B2 | 1/2007 | Shoaib et al. | 370/331 |
| 7,171,555 B1 | 1/2007 | Salowey et al. | 713/156 |
| 7,184,418 B2 | 2/2007 | Baba et al. | 370/331 |
| 7,187,931 B2 | 3/2007 | Trossen | 455/440 |
| 7,190,793 B2 | 3/2007 | Hsu | 380/270 |
| 7,197,763 B2 | 3/2007 | Hsu | 726/4 |
| 7,212,821 B2 | 5/2007 | Laroia et | 455/437 |
| 7,230,951 B2 | 6/2007 | Mizell et al. | 370/401 |
| 7,233,583 B2 | 6/2007 | Asthana et al. | 370/332 |
| 7,251,733 B2 | 7/2007 | Haverinen et al. | 713/182 |
| 7,263,371 B2 | 8/2007 | Das et al. | 455/456.1 |
| 7,269,727 B1 | 9/2007 | Mukherjee et al. | 713/160 |
| 7,272,122 B2 | 9/2007 | Trossen et al. | 370/331 |
| 7,272,123 B2 | 9/2007 | Wall | 370/331 |
| 7,275,156 B2 | 9/2007 | Balfanz et al. | 713/168 |
| 7,389,106 B2 | 6/2008 | Dawson et al. | 455/406 |
| 2001/0023428 A1 | 9/2001 | Miyazaki et al. | 709/201 |
| 2002/0021681 A1 | 2/2002 | Madour | 370/331 |
| 2002/0023174 A1 | 2/2002 | Garrett et al. | 709/245 |
| 2002/0036982 A1 | 3/2002 | Chen | 370/230 |
| 2002/0059114 A1 | 5/2002 | Cockrill et al. | 705/27 |
| 2002/0091802 A1 | 7/2002 | Paul et al. | 709/220 |
| 2002/0138601 A1 | 9/2002 | Piponius et al. | 709/223 |
| 2002/0151312 A1 | 10/2002 | Bos et al. | 455/452 |
| 2003/0021252 A1 | 1/2003 | Harper et al. | 370/338 |
| 2003/0039237 A1 | 2/2003 | Forslow | 370/352 |
| 2003/0108015 A1 * | 6/2003 | Li | 370/338 |
| 2003/0154400 A1 | 8/2003 | Pirttimaa et al. | 713/201 |
| 2003/0187817 A1 | 10/2003 | Agrawal et al. | 707/1 |
| 2003/0217165 A1 | 11/2003 | Buch et al. | 709/229 |
| 2004/0114553 A1 | 6/2004 | Jiang et al. | 370/328 |
| 2004/0162876 A1 | 8/2004 | Kohavi | 709/203 |
| 2004/0162892 A1 | 8/2004 | Hsu | 709/221 |
| 2004/0196821 A1 | 10/2004 | Haddad et al. | 370/349 |
| 2004/0210524 A1 | 10/2004 | Benenati et al. | 705/40 |
| 2004/0259562 A1 | 12/2004 | Madour | 455/452.2 |
| 2005/0002407 A1 | 1/2005 | Shaheen et al. | 370/401 |
| 2005/0025132 A1 | 2/2005 | Harper et al. | 370/352 |
| 2005/0130659 A1 | 6/2005 | Grech et al. | 455/436 |
| 2005/0149651 A1 | 7/2005 | Doak et al. | 710/52 |
| 2005/0176428 A1 | 8/2005 | Gabor et al. | 455/435.1 |
| 2005/0195766 A1 | 9/2005 | Nasieiski et al. | 370/331 |
| 2005/0201324 A1 | 9/2005 | Zheng | 370/328 |
| 2005/0213606 A1 | 9/2005 | Huang et al. | 370/467 |
| 2005/0220039 A1 | 10/2005 | Hoshino et al. | 370/261 |
| 2005/0278420 A1 | 12/2005 | Hartikainen et al. | 709/203 |
| 2005/0286709 A1 | 12/2005 | Horton et al. | 379/265.09 |
| 2006/0014547 A1 | 1/2006 | Walter | 455/456.1 |

| | | | | |
|---|---|---|---|---|
| 2006/0018272 | A1 | 1/2006 | Mutikainen et al. | 370/328 |
| 2006/0023662 | A1* | 2/2006 | Inoue | 370/328 |
| 2006/0077924 | A1 | 4/2006 | Rune | 370/328 |
| 2006/0116113 | A1 | 6/2006 | Gass | 455/414.4 |
| 2006/0126630 | A1 | 6/2006 | Shirazipour et al. | 370/392 |
| 2006/0141995 | A1* | 6/2006 | Purnadi et al. | 455/414.1 |
| 2006/0171310 | A1 | 8/2006 | Ahluwalia et al. | 370/229 |
| 2006/0250956 | A1* | 11/2006 | Alfano et al. | 370/230 |
| 2006/0251038 | A1 | 11/2006 | Tamura et al. | 370/342 |
| 2006/0264207 | A1 | 11/2006 | Tamura et al. | 455/415 |
| 2006/0268819 | A1 | 11/2006 | Chen et al. | 370/349 |
| 2007/0008882 | A1 | 1/2007 | Oran | 370/229 |
| 2007/0036312 | A1 | 2/2007 | Cai et al. | 379/126 |
| 2007/0086582 | A1 | 4/2007 | Tai et al. | 379/114.01 |
| 2007/0094712 | A1 | 4/2007 | Gibbs et al. | 726/3 |
| 2007/0121615 | A1 | 5/2007 | Weill et al. | 370/389 |
| 2007/0121642 | A1 | 5/2007 | Battin et al. | 370/395.2 |
| 2007/0153720 | A1 | 7/2007 | Baglin et al. | 370/328 |
| 2007/0206539 | A1* | 9/2007 | Tegani et al. | 370/331 |
| 2007/0254661 | A1 | 11/2007 | Chowdhury et al. | 455/436 |

FOREIGN PATENT DOCUMENTS

| | | |
|---|---|---|
| WO | WO 99/31610 | 12/1998 |
| WO | WO 2005/107297 | 11/2005 |

OTHER PUBLICATIONS

Online Inc., "Apogee Releases Content Usage-Based Billing Product Annotated Title—Software allows content usage-based billing," EContent, vol. 24, No. 5, NDN 173-0356-6509-7, 1 pg., Jul. 2001.
Centaur Communications, "Secret Bear platform allows paid-for SMS Annotated Title—Secret Bear introduced cross-network reverse billing platform allowing content providers to charge for SMS content," New Media Age, NDN 173-0354-6130-3, 1 pg., Jun. 28, 2001.
Karsten Lattge, "E-Charging API: Outsource Charging to a Payment Service Provider," NDN 174-0708-0924-8, pp. 216-227, 2001.
A. Herzberg, "Safeguarding Digital Library Contents: Charging for Online Content," D-Lib Magazine, NDN 174-0590-9051-8, 16 pgs., Jan. 1998.
Business Wire, "Apogee Networks Introduces Industry's First Content Usage-Based Billing Solution for Web Hosters," NDN 219-0281-6988-1, 2 pgs., May 8, 2001.
Business Wire, "Apogee Networks Announces Investment by Cisco Systems; Combined Efforts Enhance Billing Capabilities for Content Delivery Network Providers," NDN 219-0220-9035-0, 2 pgs., Jan. 23, 2001.
Business Wire, "Key Analysts Predict Content Billing is the Internet's New Frontier; Content is the Asset of the Industry; Apogee Networks Seen as the Leader in New Internet Industry Space," NDN 219-0162-6934-6, 3 pgs., Oct. 10, 2000.
Business Wire, "Apogee Networks Unveils NetCountant Wireless Billing At Supercomm; Company Demonstrates Industry First Wireless Content Usage Based Billing Solution," NDN 218-0324-8075-6, 2 pgs., Jun. 5, 2001.
Business Wire, "Apogee Networks Wins 2000 Communications ASP Product of the Year Award; Apogee Networks' NetCountant Billing Takes Top Honors for Innovative Content Usage Based Billing Solutions," NDN 218-0282-3757-7, 2 pgs., Mar. 21, 2001.
Business Wire, "Wireless Internet Content Billing and Settlement Capability Announced; Companies Announce Interoperability Between WAP Gateway and Content Billing System," NDN 218-0220-0997-2, 2 pgs., Dec. 6, 2000.
Business Wire, "Apogee Networks Joins Content Alliance; Billing Expert to Join Industry Group Aimed At Advancing Content Networking," NDN 218-0181-2716-7, 3 pgs., Oct. 11, 2000.
Business Wire, "Apogee Networks, Inc. and Paysys International, Inc. to Integrate Technologies to Create Advanced IP Content Billing Solutions," NDN 218-0098-0623-9, 3 pgs., Jun. 19, 2000.
Ylitalo, et al., *Re-thinking Security in IP based Micro-Mobility*, downloaded from www.tcs.hut.fi/Studies/T-79.5401/2005AUT/ISCO4-Vlitalo-e-al.pdf (12 pages).
PCT Notification of Transmittal of the International Search Report and the Written Opinion of the International Searching Authority, or the Declaration with attached PCT International Search Report and Written Opinion of the International Searching Authority in International Application No. PCT/US 07/05937, dated Oct. 25, 2007, 6 pages.
Draft—TR45—PN-3-4732-RV4 (to be published as TIA-835.1-D), 32 pages.
Draft—TR45—PN-3-4732-RV4 (to be published as TIA-835.2-D), 93 pages.
Draft—TR45—PN-3-4732-RV4 (to be published as TIA-835.3-D), 36 pages.
Draft—TR45—PN-3-4732-RV4 (to be published as TIA-835.4-D), 70 pages.
Draft—TR45—PN-3-4732-RV4 (to be published as TIA-835.5-D), 72 pages.
Draft—TR45—PN-3-4732-RV4 (to be published as TIA-835.6-D), 36 pages.
3GPP2 C.S0067, 3rd Generation Partnership Project 2 '3GPP2', "Generic Key Exchange Protocol for cdma2000 High Rate Packet Data Air Interface," Version 1.0, 24 pages, Nov. 2005.
3GPP2 X.S0011-001-D, 3rd Generation Partnership Project 2 '3GPP2', "cdma2000 Wireless IP Network Standard: Introduction," Version 1.0, 33 pages, Feb. 2006.
3GPP2 C.S0063-0, 3rd Generation Partnership Project 2 '3GPP2', "cdma2000 High Rate Packet Data Supplemental," Version 1.0, 127 pages, Mar. 2006.
3GPP2 A.S0008-A v.1.0, 3rd Generation Partnership Project 2 '3GPP2,' Interoperability Specification (IOS) for High Rate Packet Data (HRPD) Radio Access Network Interfaces with Session Control in the Access Network, 257 pages, Mar. 2006.
3GPP2 C.S0024-A, 3rd Generation Partnership Project 2 '3GPP2', "cdma2000 High Rate Packet Data Air Interface Specification," Version 2.0, 1,223 pages, Jul. 2005.
B. Aboba, et al., "Extensible Authentication Protocol (EAP)," Network Working Group, RFC 3748, http://www.ietf.org/rfc/rfc3748.txt, 59 pages, Jun. 2004.
B. Aboba, D. Simon, "PPP EAP TLS Authentication Protocol," Network Working Group, RFC 2716, http://www.ietf.org/rfc/rfc2716.txt, 22 pages, Oct. 1999.
W. Simpson, "PPP Challenge Handshake Authentication Protocol (CHAP)," Network Working Group, RFC 1994, http://www.ietf.org/rfc/rfc1994.txt, 12 pages, Aug. 1996.
W. Simpson, "The Point-to-Point (PPP)," Network Working Group, RFC 1661, http://www.ietf.org/rfc/rfc1661.txt, 47 pages, Jul. 1994.
P. Eronen, et al., "Diameter Extensible Authentication Protocol (EAP) Application," Network Working Group, RFC 4072, http://www.ietf.org/rfc/rfc4072.txt, 29 pages, Aug. 2005.
P. Calhoun, et al., "Diameter Base Protocol," Network Working Group, RFC 3588, http://www.ietf.org/rfc/rfc3588.txt, 129 pages, Sep. 2003.
3rd Generation Partnership Project 2 "3GPP2"; "All-IP Core Network Multimedia Domain: Service Based Bearer Control- Stage 2;www.3gpp2.org-"; Version 1.0. Draft Version 0.21.0, 49 pages.
PCT Notification of Transmittal of the International Search Report and the Written Opinion of the International Searching Authority, or the Declaration, International Application No. PCT/US07/05847, 9 pages, Oct. 26, 2007.
PCT Notification of Transmittal of the International Search Report and the Written Opinion of the International Searching Authority, or the Declaration, International Application No. PCT/US07/05849, 9 pages, Nov. 14, 2007.
Yegani et al., "System and Method for Access Authentication in a Mobile Wireless Network," U.S. Appl. No. 11/419,382, 20 pps, 3 pps drawings (2104), filed May 19, 2006.
Yegani et al., "System and Method for Handover of an Access Terminal in a Communication Network," U.S. Appl. No. 11/682,735, 24 pps, 3 pps drawings (2360), filed Mar. 6, 2007.
Yegani et al, Authentication of Access Terminals in a Cellular Communication Network,: U.S. Appl. No. 11/682,857, 28 pps, 5 pps drawings (2358), filed Mar. 6, 2007.
Andreasen et al., "System and Method of Consolidating Accounting Data for a Communication Session," U.S. Appl. No. 11/714,974, 40 pps, 3 pps drawings (2404), filed Mar. 6, 2007.

Panda et al., "System and Method for Capturing Accounting Data for a Communication Session," U.S. Appl. No. 11/715,018 (2402), filed Mar. 6, 2007.

Rosenberg et al., "System and Method for Determining a Network for Processing Applications for a Communication Session," U.S. Appl. No. 11/715,019, 40 pps, 3 pps drawings (2406), filed Mar. 6, 2007.

Rosenberg et al., "Determining a Policy Output for a Communication Session," U.S. Appl. No. 11/715,032, 31 pps, 4 pps drawings (2368), filed Mar. 6, 2007.

Leung et al., "Communicating Packets Using a Home Anchored Bearer Path," U.S. Appl. No. 11/715,033, 33 pps, 4 pps drawings (2407), filed Mar. 6, 2007.

Andreasen et al., "Posture-Based Network Authentication," U.S. Appl. No. 11/715,040, 23 pages, 2 pps drawings (2398), filed Mar. 6, 2007.

Iyer et al., "Access Terminal for Communicating Packets Using a Home Anchored Bearer Path," U.S. Appl. No. 11/715,041, 33 pps, 4 pps drawings (2300), filed Mar. 6, 2007.

Rosenberg et al., "System and Method for Exchanging Policy Information in a Roaming Communications Environment," U.S. Appl. No. 11/715,056, 42 pps, 3 pps drawings (2416), filed Mar. 6, 2007.

Rosenberg et al., "Establishing Facets of a Policy for a Communication Session," U.S. Appl. No. 11/715,065, 32 pps, 4 pps drawings (2409), filed Mar. 6, 2007.

Rosenberg et al., "Performing Deep Packet Inspection for a Communication Session," U.S. Appl. No. 11/715,073, 31 pps, 4 pps drawings (2400), filed Mar. 6, 2007.

Rosenberg et al., "Assigning a Serving- CSCF During Access Authentication," U.S. Appl. No. 11/715,074, 22 pps, 2 pps drawings, (2410), filed Mar. 6, 2007.

Rosenberg et al., "System and Method for Providing Emergency Services in a Visited Communications Environment," U.S. Appl. No. 11/715,111, 39 pps, 2 pps drawings (2418), filed Mar. 6, 2007.

Panda et al., "Application-Aware Policy Enforcement," U.S. Appl. No. 11/715,187, 28 pps, 2 pps drawings (2403), filed Mar. 6, 2007.

Andreasen et al., "System and Method for Generating a Unified Accounting Record for a Communication Session," U.S. Appl. No. 11/715,210, 46 pps, 3 pps drawings (2399), filed Mar. 6, 2007.

Andreasen et al., "Network-triggered quality of service (QoS) Reservation," U.S. Appl. No. 11/715,250, 21 pps, 2 pps drawings (2405), filed Mar. 6, 2007.

Andreasen et al.,; "Policy-Based Control of Content Intercept", U.S. Appl. No. 11/715,251, 23 pps, 2 pps drawings (2401).

Rosenberg et al., "System and Method for Network Charging Using Policy Peering," U.S. Appl. No. 11/715,256, 43 pps, 3 pps drawings (2415), filed Mar. 6, 2007.

* cited by examiner

ENFORCEMENT OF USER LEVEL POLICIES FROM VISITED NETWORKS IN A MOBILE IP ENVIRONMENT

RELATED APPLICATION

This application claims priority under 35 U.S.C. §119(e) of U.S. Provisional Application Ser. No. 60/780,176, entitled "VERIZON WIRELESS MULTI-MEDIA PLUS (MMD+) PROGRAM SYSTEM ARCHITECTURE DOCUMENT," filed Mar. 6, 2006, by Flemming Andreasen et al., which is incorporated herein by reference.

TECHNICAL FIELD OF THE DISCLOSURE

This disclosure relates in general to wireless communications, and more particularly to enforcement of user level policies from visited networks in a mobile IP environment.

BACKGROUND OF THE DISCLOSURE

The mobile Internet Protocol (IP) provides portable access to IP communication services. Mobile IP allows an access terminal to roam from its home network while maintaining a relatively permanent IP address. By maintaining a relatively permanent IP address, mobile IP may provide relatively seamless communication services while the access terminal moves from one network to another.

A mobile IP enabled network generally includes a home agent in the access terminal's home network and a foreign agent in a visited network where the access terminal is located. The access terminal may be any mobile IP network aware device that may be used for data communications and may be, for example, a cellular telephone, a notebook computer, or a personal digital assistant (PDA). The access terminal may connect to the Internet by forming a point of attachment to the home agent or to the foreign agent. If the access terminal connects to the Internet through the designated home agent, registration of the access terminal may be performed with the home agent in the normal manner. If the access terminal connects to the Internet through the foreign agent, however the foreign agent negotiates the connection with the home agent to register the connection.

SUMMARY OF THE DISCLOSURE

In one embodiment according to the present disclosure, a system for providing mobile Internet Protocol (IP) connectivity includes a memory and a processor. The memory stores one or more user level policies associated with an access terminal. The processor establishes a mobile IP connection with the access terminal. The processor receives the user level policies from a home IP gateway of the access terminal, and applies the user level policies to the mobile IP connection.

Embodiments of the disclosure may provide numerous technical advantages. Some, none, or all embodiments may benefit from the below described advantages. According to one embodiment, a policy enforcement point may be formed at the foreign agent when the access terminal forms a point of attachment to the foreign agent. The policy enforcement point may control various user level policy rule of the IP connection, such as quality of service (QoS), user security, accounting, user mobility, and packet inspection. Mobile IP extensions may be used to convey the user level policy rules from the home agent to the foreign agent.

Other technical advantages will be apparent to one of skill in the art.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

The home network may enforce user level policies of a mobile IP session used by the access terminal while attached to the home network. A policy enforcement point of a home network administers user level policies, such as quality of service (QoS), user security, accounting, user mobility, and packet inspection. Mobile IP, however may not provide adequate enforcement for user level policies while the access terminal is attached to the Internet through a visited network.

Figure 1:
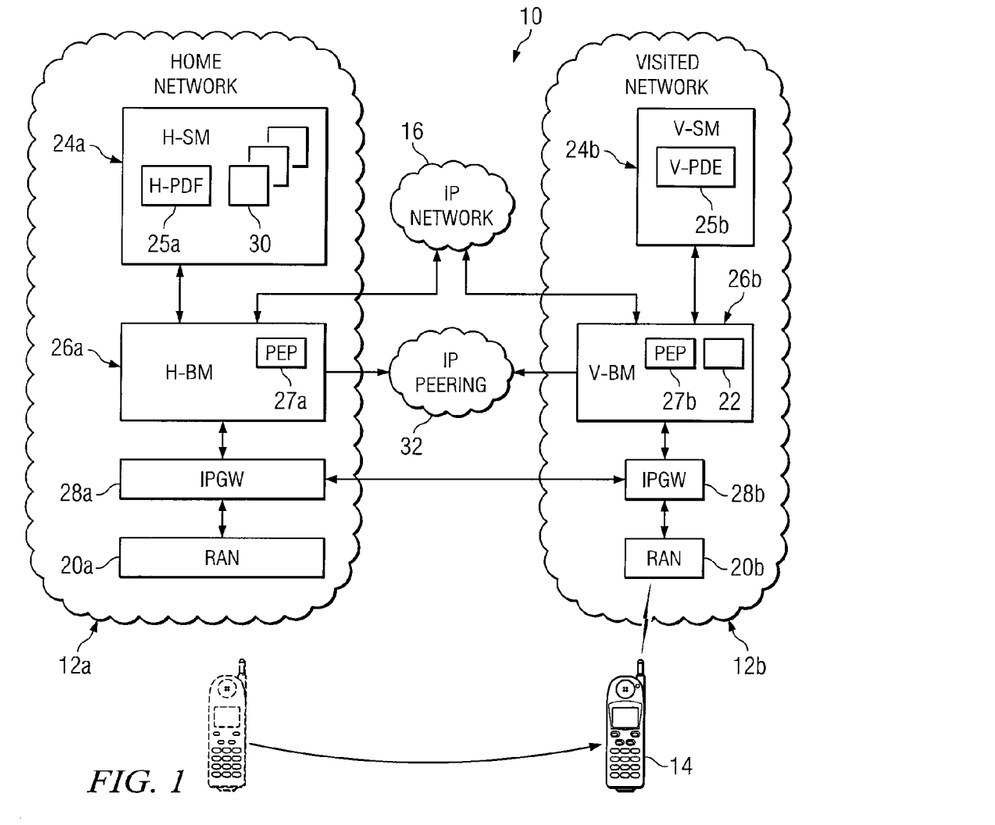
FIG. 1 is a diagram illustrating one embodiment of a mobile IP environment in accordance with the teachings of the present disclosure.

FIG. 1 is a diagram showing one embodiment of a mobile IP environment 10 that may provide for enforcement of user level policies on an access terminal when attached to a visited network. Mobile IP environment 10 generally includes a home network 12a and one or more other visited networks 12b that may connect an access terminal 14 to the IP network 16. Home network 12a may be any mobile IP enabled network. Home network 12a may be managed by a mobility service provider that has an executed service agreement contract with the user of the access terminal 14. Visited network 12b may be any mobile IP enabled network. Visited network 12b may be managed by a mobility service provider having a shared service agreement with the mobility service provider of the home network 12a. As will be described in detail below, visited network 12b may provide a policy enforcement point at the visited network 12b when the access terminal 14 forms a point of attachment to the visited network 12b.

The access terminal 14 may be any mobile IP network aware device that may be used for data communications and may be, for example, a cellular telephone, a notebook computer, or a personal digital assistant (PDA). Access terminal 14 may communicate with radio access network 20a using any suitable wireless communication network protocol, such as a CDMA network protocol. The radio access network 20 may be any suitable type of radio access network, such as a high rate packet data (HRPD) network, an Universal Mobile Telecommunications System (UTMS) or a Global System for Mobile Communications (GSM) network telecommunication system.

Home network 12a generally includes a radio access network (RAN) 20a, a security manager 24a, a home bearer manager 26a, and an IP gateway 28a. In one embodiment, home network 12a may be an IP multimedia subsystem (IMS) that provides various data communication services, such as, for example, packet-switched voice call services, e-mail messaging services, instant messaging services, and Internet access services. In another embodiment, home network 12a may be a code division multiple access 2000 (CDMA2000) multimedia domain (MMD) network. In the particular embodiment shown, home network 12a is a multimedia domain network, such that home network 12a includes a security manager 24a, a bearer manager 26a, and an IP gateway 28a.

The IP gateway 28a may be any IP packet routing device suitable for routing IP packets between the radio access network 20a and the IP network 16 through the bearer manager 26a. In one embodiment, IP gateway 28a may be operable to transcode IP packets from bearer manager 26a into RP packets suitable for transmission over the radio access network 20a.

The bearer manager 26a couples the IP gateway 28a to the IP network 16 and may provide various security functions, such as firewall functions, intrusion detection functions, and distributed denial of service (DDoS) attack prevention functions. The bearer manager 26a may have a policy enforcement point (PEP) 27a. The policy enforcement point 27a may enforce various user level policies of an IP session between the access terminal 14 and the IP network 16. In one embodiment, these user level policies may be uniquely associated with each access terminal 14.

The security manager 24a is coupled to the bearer manager 26a and may register access terminal 14 to the home network 12a or visited network 12b. Home security manager 36 may have a memory for storage of user level policies 30 associated with the access terminal 14. Examples of network policies may include quality of service (QoS), user security, accounting, user mobility, charging, and packet inspection policies.

In one embodiment, security manager 24a includes a policy decision function (PDF) 25a. Policy, decision function 25a may manage authorization of services for the access terminal 14 based on network policies. In the embodiment shown, policy decision function 25a is implemented in security manager 24a. The policy decision function 25a, however, may exist as a separate entity.

The user level policies 30 may be governed by a service agreement entered into between the mobility service provider and owner of the access terminal 18. For example, the service agreement may specify various aspects of services provided, such as expected level of quality and/or access availability. The agreed upon terms of the service agreement may then be stored as one or more user level policies 30 that may be used by the bearer manager 26a to control the level of quality and/or access availability in accordance with the agreed upon terms of the service agreement.

The security manager 24a, bearer manager 26a, and/or IP gateway 28a may be implemented on one or more computing systems, each having a computer processor that is operable to execute instructions stored in a memory. In one embodiment, security manager 24a, bearer manager 26a, and IP gateway 28a may be implemented on a single computing system in which security manager 24a, bearer manager 26a, and IP gateway 28a may communicate using, for example, internal system calls. In another embodiment, security manager 24a, bearer manager 26a, and IP gateway 28a may each be implemented on separate computing systems such that communication between security manager 24a, bearer manager 26a, and/or IP gateway 28a is accomplished via a communication link, such as an Ethernet or other similar communication link.

The visited network 12b generally includes a radio access network (RAN) 20b, a visited security manager 24b, a visited bearer manager 26b, and an IP gateway 28b. In one embodiment, visited network 12b may be a multimedia domain network, such that visited network 12b includes an IP gateway 28b, a bearer manager 26b, a policy decision function 25b, and a security manager 24b that function in a manner similar to the IP gateway 28a, bearer manager 26a, policy decision function 25a, and security manager 24a of home network 12a. The visited bearer manager 26b differs from home bearer manager 26a in that visited bearer manager 26b may have a foreign agent 22. Foreign agent 22 may implement mobile IP functions at the visited bearer manager 26a.

In one embodiment, bearer manager 26b serves as a policy enforcement point for various user level policies when access terminal 14 has a point of attachment to the visited network 12b. In another embodiment, the policy enforcement point may be shared between the bearer manager 26a in the home network 12a and the bearer manager 26b in the visited network 12b. In one embodiment, an IP peering connection 32 may be provided for communication of user level policies 30 in between home policy decision function 25a and visited policy decision function 25b. Home policy decision function 25a and visited policy decision function 25b may also have a policy peering relationship with home bearer manager 26a and visited bearer manager 26b, respectively.

In the particular embodiment described above, enforcement of user level policies 30 in visited network 12b may be provided by the bearer manager 26b. Enforcement of user level policies 30, however may be provided by any network node in the visited network 12b, in other embodiments. For example, IP gateway 28b in visited network 12b may be used as a policy enforcement point for control of mobile IP connectivity of access terminal 14 to the IP network 16.

As described previously, registration of access terminal 14 to the IP network 16 through either home network 12a or visited network 12b may include implementation of one or more user level policies 30 that are stored in the security manager 24a of the access terminal's home network 12a. When connected to the IP network 16 through the home network 12a, the bearer manager 26a may use these user level policies 30 to control various network-based provisions of the mobile IP session. The bearer manager 26b in the visited network 12b may also use these user level policies 30 to control various network-based provisions of the mobile IP session when the access terminal 14 has a point of attachment to the visited network 12b. Although home network 12a is described in this disclosure as the designated home network of access terminal 14, it should be understood that home network 12a may serve as a visited network and visited network 12b may serve as a home network for another access terminal in which visited network 12b is the designated home network.

The mobile IP protocol provides mobile IP control messages for transmitting information between the home IP gateway 28a and foreign agent 22. In one embodiment, user level policies 30 may be transmitted from the home IP gateway 28a to the foreign agent 22 as one or more extensions in a mobile IP control message.

A component of environment 10 may include any suitable arrangement of elements, for example, an interface, logic, memory, other suitable element, or a combination of any of the preceding. An interface receives input, sends output, processes the input and/or output, performs other suitable operation, or performs a combination of any of the preceding. An interface may comprise hardware and/or software.

Logic performs the operations of the component, for example, executes instructions to generate output from input. Logic may include hardware, software, other logic, or a combination of any of the preceding. Certain logic, such as a processor, may manage the operation of a component. Examples of a processor include one or more applications, other logic, or a combination of any of the preceding.

A memory stores information. A memory may comprise computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), other computer-readable medium, or a combination of any of the preceding.

Modifications, additions, or omissions may be made to environment 10 without departing from the scope of the invention. The components of environment 10 may be integrated or separated. Moreover, the operations of environment 10 may be performed by more, fewer, or other components. Additionally, operations of environment 10 may be performed using any suitable logic comprising software, hardware, other logic, or any suitable combination of the preceding. As used in this document, "each" refers to each member of a set or each member of a subset of a set.

Figure 2A:
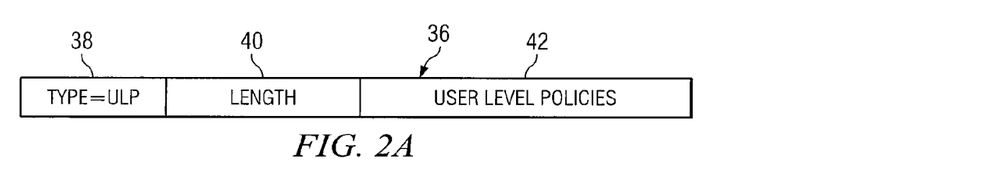
FIG. 2A is an illustration showing one embodiment of a mobile IP extension that may be used by the mobile IP environment of FIG. 1.

FIG. 2A shows one embodiment of a mobile IP extension that may be used to convey user level policies 30 from the home bearer manager 26a to the foreign agent as a mobile IP control message. This particular mobile IP extension is a standard mobile IP extension 36 that may be formatted according to "IP Mobility Support," RFC 2002 of the Network Working Group (October 1996).

Standard mobile IP extension 36 includes a type field 38, a length field 40, and an user level policies field 42. The type field 38 indicates that this particular extension is an user level policies extension. The type field 38 may be any numeric value that uniquely identifies the standard mobile IP extension 36 from other types of mobile IP extensions. The length field 40 specifies the length of the extension in bytes.

The user level policies field 42 may include one or more policy identifiers corresponding to one or more user level policies. For example, the user level policy field may include one policy identifiers corresponding to one particular user level policy, such as the charging policy to be applied to a particular mobile IP session. As another example, the user level policy field 42 may include several policy identifiers corresponding to several user level policies, such as the quality of service, user security level, and user mobility to be applied to another particular mobile IP session. In one embodiment, a single mobile IP extension 36 may be used. In another embodiment, a number of mobile IP extensions 36 may be used.

In one embodiment, the standard mobile IP extension 36 may be skippable such that the foreign agent 22 will continue to process the remaining extensions in the IP control message in the event that one or more user level policy rules are not recognized. Certain embodiments incorporating skippable extensions may provide an advantage in that mobile IP registration with a foreign agent may still be allowed with visited networks that do recognize user level policy rules from the home IP gateway 28a.

Figure 2B:
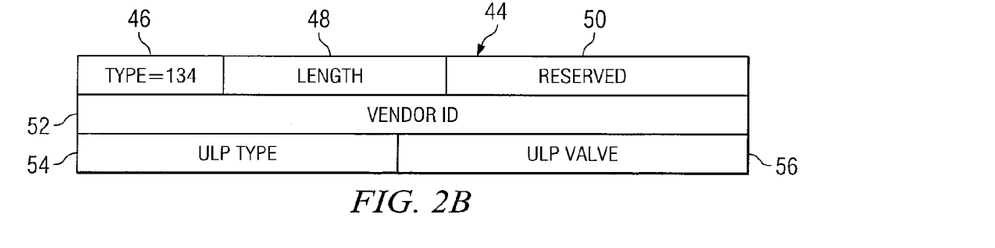
FIG. 2B is an illustration showing another embodiment of a mobile IP extension that may be used by the mobile IP environment of FIG. 1.

FIG. 2B shows another embodiment of a mobile IP extension that may be used to convey the various user level policies 30 from the home IP gateway 28a to the foreign agent 22. This particular mobile IP extension is a vendor-specific mobile IP extension 44 that may be formatted according to "Mobile IP Vendor/Organization-Specific Extensions," RFC 3115 of the Network Working Group (April 2001). Vendor-specific mobile IP extension may be a normal vendor-specific extension or a critical vendor specific extension. In one embodiment, vendor-specific mobile IP extension 44 is a normal vendor-specific mobile IP extension. Certain embodiments incorporating a normal vendor-specific mobile IP extension may provide an advantage in that the normal vendor-specific mobile IP extension 44 may not cause connection errors with visited networks that may not recognize user level policy messages.

Vendor-specific mobile IP extension 44 generally includes a type field 46, a length field 48, a reserved field 50, a vendor ID field 52, an user level policy type field 54, and an user level policy value field 56. More specifically, the type field 46 has a value of 134 to indicate that the extension is a normal vendor-specific extension. Length field 48 specifies the length of the extension in bytes. The vendor ID field 52 indicates the identity of the home network 12a. The user level policies field 56 may include one or more policy identifiers corresponding to one or more user level policies as described above. The user level policies field 56 is generally similar to the user level policy field 42 of FIG. 2A and may include one or more policy identifiers corresponding to one or more user level policies as described above.

In one embodiment, extensions may be implemented on mobile IP version 4 (MIPv4) control messages. MIPv4 control messages are described in document "IP Mobility Support For IPv4," RFC 3344 of the Network Working Group (August 2002). In another embodiment, extensions may be implemented on mobile IP version 6 (MIPv6) control messages. MIPv6 control messages are described in document "IP Mobility Support For IPv6," RFC 3775 of the Network Working Group (June 2004).

Figure 3:
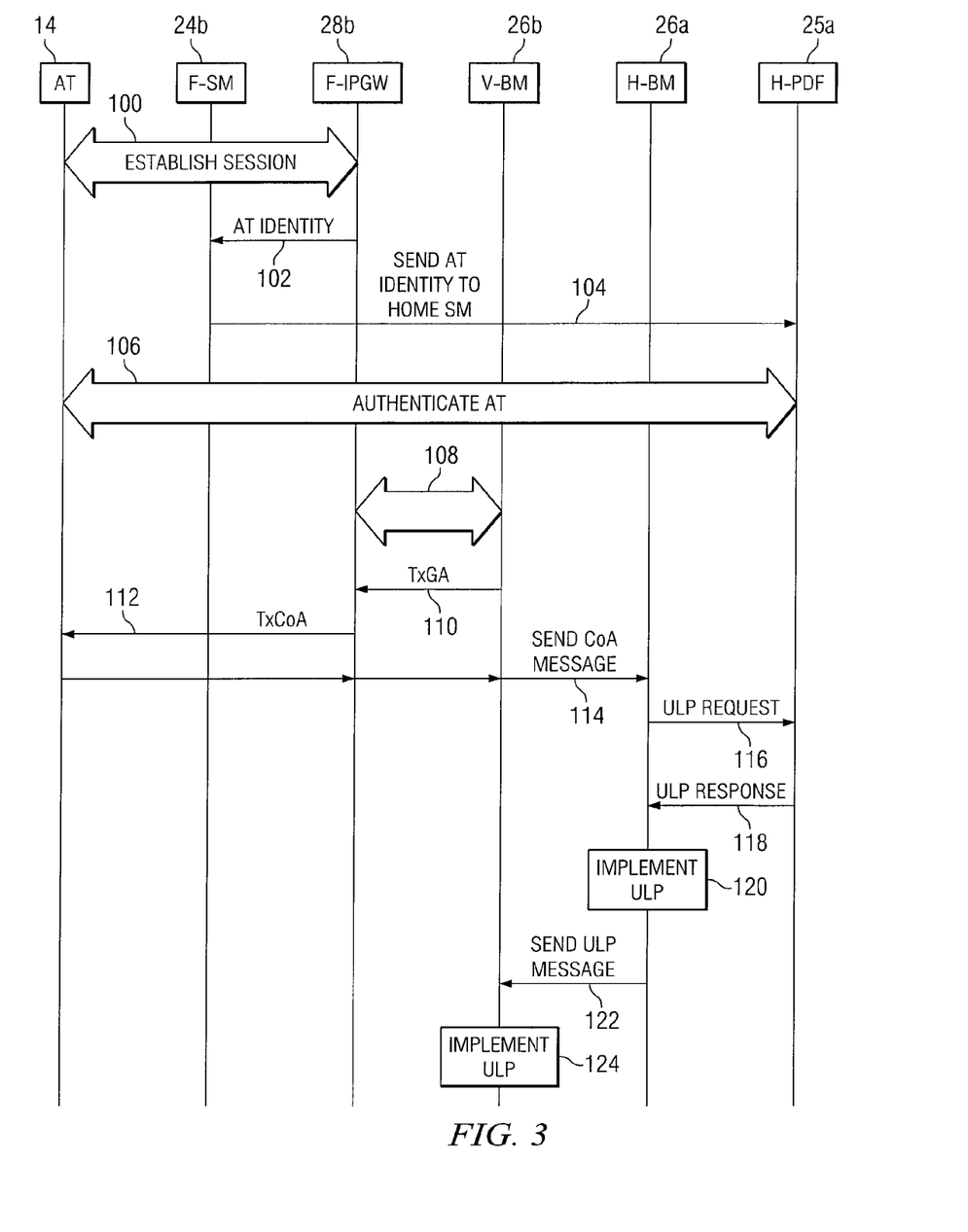
FIG. 3 is a call-flow diagram illustrating one embodiment of a mobile IP registration on the mobile IP environment of FIG. 1.

FIG. 3 is a call-flow diagram illustrating one embodiment of a method for mobile IP registration of an access terminal 14 in which user level policies may be enforced from a visited network 12b. At step 100, the access terminal 14 establishes a session with the IP gateway 28b in the visited network 12b. The access terminal 14 establishes a session by forming a point of attachment to the IP gateway 28b via the radio access network 20b.

At step 102, the IP gateway 28b sends the identity asserted by the access terminal 14 in an identity message to the visited security manager 24b. At step 104, the IP gateway 28b determines the home network 12a of the access terminal 14 and sends this identity message to the home security manager 24a. In one embodiment, the visited security manager 24b may determine the home network using a domain portion of the identity, wherein the identity may be of the form "user@domain."

At step 106, once the home security manager 24a receives the identity message, it proceeds to authenticate the access terminal 14. The home security manager 24a may authenticate the access terminal 14 using any suitable authentication protocol. In one embodiment, the home security manager 24a authenticates the access terminal 14 using an EAP protocol. In another embodiment, the home security manager 24a authenticates the access terminal 14 using a point-to-point protocol (PPP).

At step 108, the IP gateway 28b establishes a mobility binding with the bearer manager 26b in the visited network 12b. At step 110, the bearer manager 26b generates a care-of-address and sends this care-of-address to the IP gateway 28b. In one embodiment, the bearer manager 26b generates the care-of-address using a Stateless Address Auto Configuration (SLAAC) according to "IPv6 Stateless Address Auto-configuration," RFC 2462 of Network Working Group (December 1998). In another embodiment, the bearer manager 26b generates the care-of-address using a dynamic host configuration protocol (DHCP). "Dynamic Host Configuration Protocol for IPv6," RFC 3315 of the Network Working Group (July 2003), describes one embodiment of a protocol that may be used to implement DHCP for generation of the care-of-address. At step 112, IP gateway 28b forwards this care-of-address to the access terminal 14.

At step 114, the access terminal 14 registers the care-of-address by sending a care-of-address message to the home bearer manager 26a. At step 116, the home bearer manager 26a sends an user level policy request message to the home policy decision function 25a requesting any available user level policies 30 associated with the access terminal 14. At step 118, the home policy decision function 25a responds by sending the requested user level policies 30 to the home bearer manager 26a.

At step 120, the bearer manager 26a implements any pertinent user level policy controls on the pending mobile IP session. At step 122, the home bearer manager 26a forwards the user level policy message to the visited bearer manager 26b. At step 124, the visited bearer manger 26b applies any pertinent user level policy controls to the pending mobile IP session. At this point, mobile IP service registration is complete.

The mobile IP service registration described above may be implemented with any mobile IP enabled network having a configurable policy enforcement point. For example, the mobile IP service registration described above may be implemented on an access terminal 14 that has formed a point of attachment to a multimedia domain network. In another example, the mobile IP service registration may be accomplished in a similar manner with a non-multimedia domain network, yet having a configurable policy enforcement point, such as an IP gateway 28b. That is, nodes other than the bearer manager 26b may be used as a policy enforcement point for control of access terminal 14 in a mobile IP session. The IP gateway 28b may also be used for negotiating the registration of the access terminal 14 to the foreign agent 22.

Modifications, additions, or omissions may be made to the method without departing from the scope of the invention. The method may include more, fewer, or other steps. Additionally, steps may be performed in any suitable order.

Embodiments of the disclosure may provide numerous technical advantages. Some, none, or all embodiments may benefit from the below described advantages. According to one embodiment, a policy enforcement point may be formed at the foreign agent when the access terminal forms a point of attachment to the foreign agent. The policy enforcement point may control various user level policy rule of the IP connection, such as quality of service (QoS), user security, accounting, user mobility, and packet inspection. Mobile IP extensions may be used to convey the user level policy rules from the home agent to the foreign agent.

Although the present disclosure describes several embodiments, various changes and modifications may be suggested to one skilled in the art. It is intended that the present disclosure encompass such changes and modifications as falls within the scope of the appended claims.

What is claimed is:

1. A system for providing mobile Internet Protocol (IP) connectivity, comprising:
    a memory configured to store a plurality of user level policies associated with an access terminal; and
    a processor of a visited bearer manager, the processor in communication with the memory and configured to:
        establish a mobile IP connection with the access terminal;
        receive at the visited bearer manager the user level policies in a skippable mobile IP extension of a control message sent from a home bearer manager in response to registering a care-of address of the access terminal, the mobile IP extension comprising a user level policies field communicating one or more policy identifiers corresponding to the user level policies;
        skip a user level policy of the user level policies that is not recognizable; and
        apply user level policies that are recognizable to the mobile IP connection.

2. The system of claim 1, wherein the processor is further configured to receive the user level policies in a standard mobile IP extension.

3. The system of claim 1, wherein the processor is further operable to receive the user level policies in a vendor-specific mobile IP extension.

4. The system of claim 1, wherein the user level policies are selected from the group consisting of a quality of service policy, a security policy, an accounting policy, a mobility policy, a charging policy, and a packet inspection policy.

5. A method for providing mobile Internet Protocol (IP) connectivity from a foreign network, comprising:
    establishing a mobile IP connection with an access terminal;
    receiving, at a visited bearer manager, a plurality of user level policies in a skippable mobile IP extension of a control message sent from a home bearer manager in response to registering a care-of address of the access terminal, the mobile IP extension comprising a user level policies field communicating one or more policy identifiers corresponding to the user level policies;
    skipping a user level policy of the user level policies that is not recognizable; and
    applying user level policies that are recognizable to the mobile IP connection.

6. The method of claim 5, wherein receiving the user level policies further comprises:
    receiving the user level policies in a standard mobile IP extension.

7. The method of claim 5, wherein receiving the user level policies further comprises:
    receiving the user level policies in a vendor-specific mobile IP extension.

8. The method of claim 5, wherein receiving the user level policies further comprises:
    receiving the user level policies in a skippable mobile IP extension.

9. The method of claim 5, wherein the user level policies are selected from a group consisting of a quality of service policy, a security policy, an accounting policy, a mobility policy, a charging policy, and a packet inspection policy.

10. A logic for providing mobile Internet Protocol (IP) connectivity from a foreign network, the logic embodied in a non-transitory computer-readable storage medium and configured to:
    establish a mobile IP connection with an access terminal;
    receive, at a visited bearer manager, a plurality of user level policies in a skippable mobile IP extension of a control message sent from a home bearer manager in response to registering a care-of address of the access terminal, the mobile IP extension comprising a user level policies field communicating one or more policy identifiers corresponding to the user level policies;
    skip a user level policy of the user level policies that is not recognizable; and
    apply user level policies that are recognizable to the mobile IP connection.

11. The logic of claim 10, wherein the logic is further configured to receive the user level policies in a standard mobile IP extension.

12. The logic of claim 10, wherein the logic is further configured to receive the user level policies in a vendor-specific mobile IP extension.

13. The logic of claim 10, wherein the logic is further configured to receive the user level policies in a skippable mobile IP extension.

14. The logic of claim 10, wherein the user level policies are selected from a group consisting of a quality of service policy, a security policy, an accounting policy, a mobility policy, a charging policy, and a packet inspection policy.

15. A system for providing mobile Internet Protocol (IP) connectivity, comprising:

means for establishing a mobile IP connection with an access terminal;

means for receiving a plurality of user level policies in a skippable mobile IP extension of a control message sent from a home bearer manager in response to registering a care-of address of the access terminal, the mobile IP extension comprising a user level policies field communicating one or more policy identifiers corresponding to the user level policies;

means for skipping a user level policy of the user level policies that is not recognizable; and means for applying user level policies that are recognizable to the mobile IP connection.

* * * * *